(12) United States Patent
Minami et al.

(10) Patent No.: US 10,907,736 B2
(45) Date of Patent: Feb. 2, 2021

(54) SPLIT SEAL RING

(71) Applicant: NIPPON VALQUA INDUSTRIES, LTD., Tokyo (JP)

(72) Inventors: Mitsuru Minami, Gojo (JP); Akira Ueda, Gojo (JP); Jyunichi Yamashita, Gojo (JP); Akihiro Nagano, Gojo (JP); Katsuhisa Umeda, Gojo (JP)

(73) Assignee: VALQUA, LTD., Tokyo (JP)

( * ) Notice: Subject to any disclaimer, the term of this patent is extended or adjusted under 35 U.S.C. 154(b) by 103 days.

(21) Appl. No.: 16/099,104

(22) PCT Filed: May 12, 2017

(86) PCT No.: PCT/JP2017/018002
§ 371 (c)(1),
(2) Date: Nov. 5, 2018

(87) PCT Pub. No.: WO2017/199871
PCT Pub. Date: Nov. 23, 2017

(65) Prior Publication Data
US 2019/0203841 A1  Jul. 4, 2019

(30) Foreign Application Priority Data
May 19, 2016 (JP) .................. 2016-100492

(51) Int. Cl.
F16J 15/34 (2006.01)
F16J 15/3272 (2016.01)

(52) U.S. Cl.
CPC ....... F16J 15/3488 (2013.01); F16J 15/3272 (2013.01)

(58) Field of Classification Search
CPC .... F16J 15/3488; F16J 15/3272; F16J 15/067; F16J 15/3464; F16J 15/3268
(Continued)

(56) References Cited

U.S. PATENT DOCUMENTS

| 1,261,897 A * | 4/1918 | Bernard | F16J 9/14 |
| | | | 277/498 |
| 4,157,833 A * | 6/1979 | Kozlowski | F16J 15/20 |
| | | | 277/511 |

(Continued)

FOREIGN PATENT DOCUMENTS

| CN | 2390014 Y | 8/2000 |
| CN | 2584954 Y | 11/2003 |

(Continued)

OTHER PUBLICATIONS

Chinese Office Action dated Oct. 30, 2019, which issued in the counterpart Chinese Patent Application No. 20170030668.2, including English translation.

(Continued)

*Primary Examiner* — Nathan Cumar
(74) *Attorney, Agent, or Firm* — Dickinson Wright PLLC

(57) ABSTRACT

A split seal ring includes: an annular main body seal split partially in a circumferential direction; and abutment surfaces provided on split surfaces of the main body seal so as to be joined to each other. Each of the abutment surfaces includes: a first inclined surface extending in a direction intersecting with the circumferential direction; a first horizontal surface extending from one end side of the first inclined surface along the circumferential direction; and a second inclined surface extending from an end of the first horizontal surface opposite to the first inclined surface in the direction intersecting with the circumferential direction. With this configuration, there can be provided a split seal ring having a structure that can improve the sealing performance.

4 Claims, 6 Drawing Sheets

(58) Field of Classification Search
USPC ......................................................... 277/399
See application file for complete search history.

(56) References Cited

U.S. PATENT DOCUMENTS

| | | | | |
|---|---|---|---|---|
| 8,061,716 | B2* | 11/2011 | Wirt ........................... | F16J 9/14 |
| | | | | 277/497 |
| 10,359,114 | B2* | 7/2019 | Seki ....................... | F16J 15/164 |
| 2012/0112415 | A1* | 5/2012 | Benjamin ............. | F01D 11/003 |
| | | | | 277/303 |
| 2015/0308507 | A1* | 10/2015 | Kanamoto .......... | F16C 33/7846 |
| | | | | 384/484 |
| 2015/0316152 | A1* | 11/2015 | Fietz .................... | F16C 33/783 |
| | | | | 277/566 |

FOREIGN PATENT DOCUMENTS

| | | |
|---|---|---|
| CN | 201358845 Y | 12/2009 |
| CN | 201934655 U | 8/2011 |
| EP | 2 837 857 A1 | 2/2015 |
| GB | 585375 A | 2/1947 |
| JP | S54-086048 A | 7/1979 |
| JP | S62-214258 A | 9/1987 |
| JP | S64-48475 U | 3/1989 |
| JP | H11-218219 A | 8/1999 |
| JP | H11-325259 A | 11/1999 |
| JP | 2004-190796 A | 7/2004 |
| JP | 2005-308002 A | 11/2005 |
| JP | 2013-217472 A | 10/2013 |
| JP | 2014-020523 A | 2/2014 |
| JP | 2015-537178 A | 12/2015 |
| JP | 6021056 B2 | 11/2016 |
| SU | 1104334 A1 | 7/1984 |
| WO | WO 2008-013281 A1 | 12/2009 |

OTHER PUBLICATIONS

JPS54-086048 A, US-4,157,833 A.
JP2015-537178 A, US-2015/0316152 A1.
JP2013-217472 A, EP2 837 857 A1.
International Search Report dated Jul. 25, 2017, which issued in PCT Patent Application No. PCT/JP2017/018002.
Chinese Office Action dated Jun. 16, 2020, which issued in the counterpart Chinese Patent Application No. 201780030668.2, including English translation.

* cited by examiner

| PRODUCT | FIRST EMBODIMENT | COMPARATIVE EXAMPLE 1 | COMPARATIVE EXAMPLE 2 |
|---|---|---|---|
| SEALABILITY | B | A | F |
| MOUNTABILITY | A | F | A |
| FRICTION RESISTANCE | B | B | B |
| PRESSURE RESISTANCE | B | B | F |
| LIFE | B | B | B |

SPLIT SEAL RING

TECHNICAL FIELD

The present invention relates to a structure of a split seal ring suitable for preventing oil leakage in a hydraulic elevator jack, a hydraulic cylinder and other fluid transmission apparatuses.

BACKGROUND ART

WO 2008/013281 (PTD 1), Japanese Patent Laying-Open No. 2005-308002 (PTD 2), Japanese Patent Laying-Open No. 11-325259 (PTD 3), Japanese Patent Laying-Open No. 11-218219 (PTD 4), and Japanese Utility Model Laying-Open No. 64-48475 (PTD 5) disclose a seal ring formed of an annular member, the seal ring being split partially in a circumferential direction and end faces facing each other being abutted.

By using such a split seal ring, the seal ring can be replaced without disassembling a fluid transmission apparatus. Therefore, the man-hour and cost of maintenance of the fluid transmission apparatus can be reduced.

CITATION LIST

Patent Document

PTD 1: WO 2008/013281
PTD 2: Japanese Patent Laying-Open No. 2005-308002
PTD 3: Japanese Patent Laying-Open No. 11-325259
PTD 4: Japanese Patent Laying-Open No. 11-218219
PTD 5: Japanese Utility Model Laying-Open No. 64-48475

SUMMARY OF INVENTION

Technical Problem

In recent years, a seal ring with improved sealing performance has been demanded. Therefore, an object of the present invention is to provide a split seal ring having a structure that can improve the sealing performance.

Solution to Problem

A split seal ring includes: an annular main body seal split partially in a circumferential direction; and abutment surfaces provided on split surfaces of the main body seal so as to be joined to each other. Each of the abutment surfaces includes: a first inclined surface extending in a direction intersecting with the circumferential direction; a first horizontal surface extending from one end side of the first inclined surface along the circumferential direction; and a second inclined surface extending from an end of the first horizontal surface opposite to the first inclined surface in the direction intersecting with the circumferential direction.

In another aspect, each of the abutment surfaces includes: a second horizontal surface extending from one end side of the second inclined surface opposite to the first horizontal surface along the circumferential direction; and a third inclined surface extending from an end of the second horizontal surface opposite to the second inclined surface in the direction intersecting with the circumferential direction.

In still another aspect, inner protruding portions protruding toward a radial inner circumference are provided on a radial inner circumferential-side side surface of the main body seal, the number of the inner protruding portions being identical to the number of the inclined surfaces, and outer protruding portions protruding toward a radial outer circumference are provided on a radial outer circumferential-side side surface of the main body seal, the number of the outer protruding portions being identical to the number of the inclined surfaces.

Advantageous Effects of Invention

According to the present invention, there can be provided a split seal ring having a structure that can improve the sealing performance.

DESCRIPTION OF EMBODIMENTS

Figure 1:
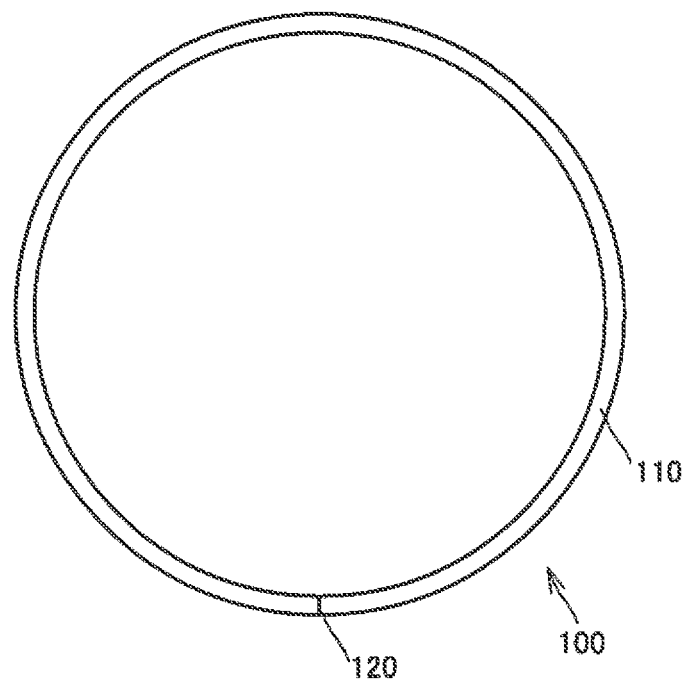
FIG. 1 is a plan view of a split seal ring according to a first embodiment.

Hereinafter, a split seal ring according to each embodiment based on the present invention will be described with reference to the drawings. When the number, an amount or the like is mentioned in the embodiments described below, the scope of the present invention is not necessarily limited to that number, that amount or the like, unless otherwise specified. The same or corresponding components are denoted by the same reference numerals, and redundant description is not repeated in some cases.

First Embodiment: Split Seal Ring 100

Figure 2:
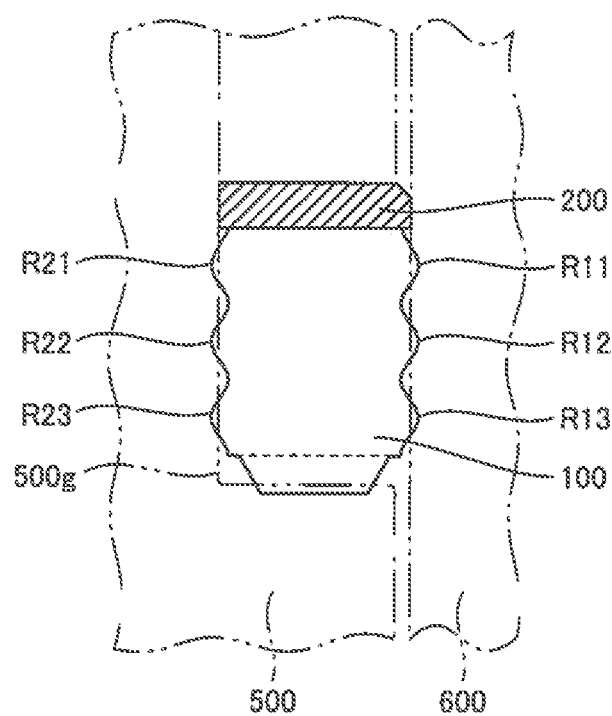
FIG. 2 is a cross-sectional view of the split seal ring according to the first embodiment.
Figures 3, 4:
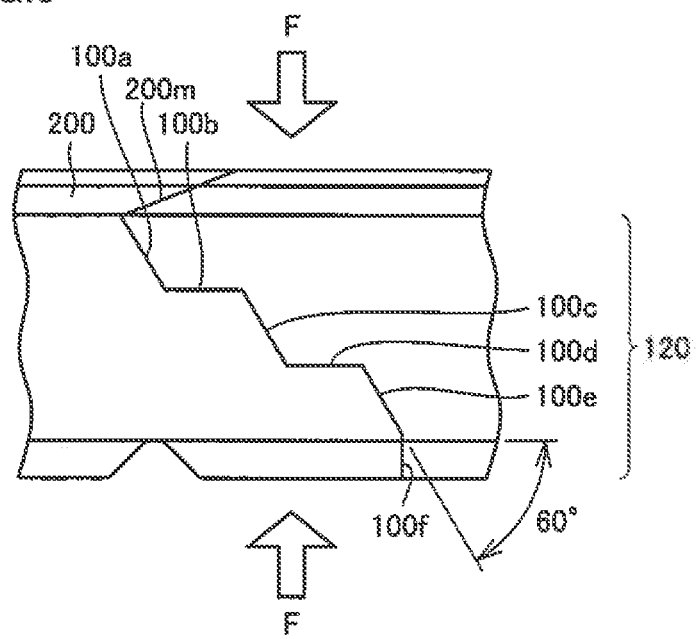
FIG. 3 shows an abutment surface of the split seal ring according to the first embodiment when viewed from the outer circumferential surface side.
FIG. 4 shows an evaluation result of the split seal ring according to the first embodiment.

A split seal ring 100 according to a first embodiment will be described with reference to FIGS. 1 to 4. FIG. 1 is a plan view of split seal ring 100. FIG. 2 is a cross-sectional view of split seal ring 100. FIG. 3 shows an abutment surface of split seal ring 100 when viewed from the outer circumferential surface side. FIG. 4 shows an evaluation result of split seal ring 100.

Referring to FIG. 1, split seal ring 100 according to the present embodiment has an annular main body seal 110. Hydrogenated nitrile rubber (HNBR), nitrile rubber (NBR), fluororubber (FKM) or the like is, for example, used as a material. Main body seal 110 is split partially in a circumferential direction and abutment surfaces 120 are provided on split surfaces of main body seal 110 so as to be joined to each other.

FIG. 2 is a cross-sectional view showing a state in which split seal ring 100 is mounted into a seal groove 500g provided in a cylinder 500 supporting a sliding ram 600. In the present embodiment, in addition to split seal ring 100, a back-up ring 200 is also used. Filled polytetrafluoroethylene (PTFE) or the like is used for back-up ring 200. Back-up ring 200 has a rectangular shape that is long in the right and left direction.

As one example of an outer size of split seal ring 100, a width is approximately 12 mm to 13 mm, a height is approximately 15 mm, and an outer diameter is approximately 150 mm. As one example of an outer size of back-up ring 200, a width is approximately 12 mm to 13 mm, a height is approximately 5 mm, and an outer diameter is approximately 150 mm.

In split seal ring 100, inner protruding portions R11, R12 and R13 protruding toward a radial inner circumference are provided at three points on a radial inner circumferential-side side surface of main body seal 110 along the circumferential direction. Inner protruding portions R11, R12 and R13 are provided to correspond to below-described inclined surfaces provided for abutment surface 120. Therefore, the number of inner protruding portions R11, R12 and R13 is identical to the number of the inclined surfaces.

Similarly, outer protruding portions R21, R22 and R23 protruding toward a radial outer circumference are provided at three points on a radial outer circumferential-side side surface of main body seal 110 along the circumferential direction. Outer protruding portions R21, R22 and R23 are provided to correspond to below-described inclined surfaces provided for abutment surface 120. Therefore, the number of outer protruding portions R21, R22 and R23 is identical to the number of the inclined surfaces. In addition, inner protruding portions R11, R12 and R13 and outer protruding portions R21, R22 and R23 are symmetric in terms of cross-sectional shape. Since three outwardly-protruding regions are provided as described above, the number of lips is three.

A structure of abutment surface 120 of split seal ring 100 and an abutment surface 200m of back-up ring 200 will be described with reference to FIG. 3. Abutment surface 120 of split seal ring 100 includes a first inclined surface 100a extending in a direction intersecting with the circumferential direction, a first horizontal surface 100b extending from one end side (lower side in the figure) of first inclined surface 100a along the circumferential direction, and a second inclined surface 100c extending from an end of first horizontal surface 100b opposite to first inclined surface 100a in the direction intersecting with the circumferential direction.

Abutment surface 120 of split seal ring 100 further includes a second horizontal surface 100d extending from one end side (lower side in the figure) of second inclined surface 100c opposite to first horizontal surface 100b along the circumferential direction, and a third inclined surface 100e extending from an end of second horizontal surface 100d opposite to second inclined surface 100c in the direction intersecting with the circumferential direction. A vertical surface 100f extending in a vertical direction with respect to second horizontal surface 100d is provided on one end side (lower side in the figure) of third inclined surface 100e.

Therefore, abutment surface 120 of split seal ring 100 is formed of three inclined surfaces, two horizontal surfaces and one vertical surface. The three inclined surfaces are all inclined at an intersection angle of about 60 degrees with respect to the horizontal surface.

A length of the horizontal surface along the circumferential direction is preferably not less than 3 mm, and is preferably approximately 5 mm in consideration of sealability and productivity. The intersection angle of the inclined surface with respect to the horizontal surface is preferably less than 90 degrees and not less than 45 degrees, and is preferably about 60 degrees.

Abutment surface 200m of back-up ring 200 is provided with one inclined surface inclined in a direction opposite to the inclination direction of the inclined surfaces provided for abutment surface 120 of split seal ring 100. This inclined surface is inclined at an intersection angle of about 20 degrees with respect to the horizontal surface.

When split seal ring 100 having the above-described structure is mounted into seal groove 500g, split seal ring 100 may be mounted with split seal ring 100 being tightened from an upward and downward direction. A tightening margin is set to range from 1% to 5%, and is preferably about 3%. As a result, pressure (an arrow F in the figure) is applied from the upward and downward direction as shown in FIG. 3 on a first axial face and a second axial face, and thus, sealability at the inclined surfaces and the horizontal surfaces can be improved.

In addition, split seal ring 100 is provided with abutment surface 120. Therefore, when split seal ring 100 is used in, for example, a hydraulic jack, the replacement work of the split seal ring can be easily performed, without overhauling the hydraulic jack itself. The same is applied as well to back-up ring 200.

(Evaluation Result)

FIG. 4 shows an evaluation result when split seal ring 100 described in the present embodiment is used and when Comparative Examples 1 and 2 are used. In Comparative Example 1, a non-split seal ring was used. In Comparative Example 2, a seal ring split not in a circumferential direction but in a perpendicular direction and having abutment surfaces (one-cut surfaces) was used. Pressure was applied at an air pressure of 0.5 MPa and a seal test was carried out. The test time was 2 minutes and the seal rings used for the test were made of nitrile rubber (NBR). In FIG. 4, the evaluation "A" indicates "excellent", the evaluation "B" indicates practicably "good" although it is not as excellent as "A", and the evaluation "F" indicates "difficult in practical use".

As to sealability, the evaluation for Comparative Example 1 is "A" because there are no split surfaces, the evaluation for split seal ring 100 described in the present embodiment is "B", and the evaluation for Comparative Example 2 is "F". As to mountability, the evaluation for split seal ring 100 described in the present embodiment and Comparative Example 2 is "A" because there are abutment surfaces, and the evaluation for Comparative Example 1 is "F" because there are no abutment surfaces.

As to friction resistance, the evaluation for split seal ring 100 described in the present embodiment and Comparative Examples 1 and 2 is "B". As to pressure resistance, the evaluation for split seal ring 100 described in the present embodiment and Comparative Example 1 is "B", and the evaluation for Comparative Example 2 is "F". As to life, the evaluation for split seal ring 100 described in the present embodiment and Comparative Examples 1 and 2 is "B".

Second Embodiment: Split Seal Rings 100A, 100B and 100C

Figure 5:
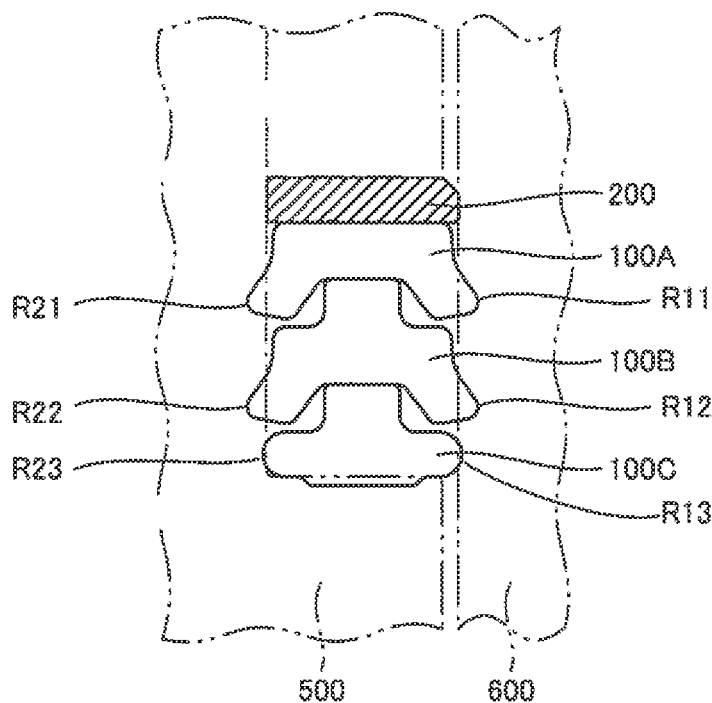
FIG. 5 is a cross-sectional view of split seal rings according to a second embodiment.
Figure 6:
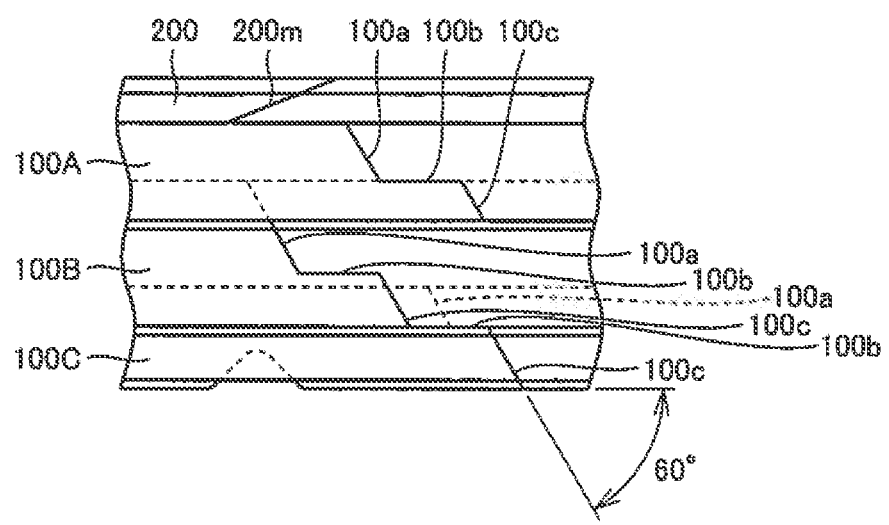
FIG. 6 shows abutment surfaces of the split seal rings according to the second embodiment when viewed from the outer circumferential surface side.

Split seal rings 100A, 100B and 100C according to a second embodiment will be described with reference to FIGS. 5 and 6. FIG. 5 is a cross-sectional view of split seal rings 100A, 100B and 100C. FIG. 6 shows abutment surfaces of split seal rings 100A, 100B and 100C when viewed from the outer circumferential surface side.

The present embodiment shows the case in which three split seal rings 100A, 100B and 100C having different cross-sectional shapes are stacked. Split seal ring 100A has a concave cross-sectional shape having a recessed portion on the lower side. Each of split seal rings 100B and 100C has a convex cross-sectional shape having a protruding portion on the upper side. The structure of back-up ring 200 is similar to that of the above-described first embodiment.

Split seal ring 100A functions as a bottom packing, split seal ring 100B functions as a main packing, and split seal ring 100C functions as a support adapter. Similarly to the first embodiment, hydrogenated nitrile rubber (HNBR), nitrile rubber (NBR), fluororubber (FKM) or the like is, for example, used for split seal rings 100A, 100B and 100C.

Since split seal rings 100A, 100B and 100C have outwardly-protruding regions R11 to R13 and R21 to R23, the number of lips is three similarly to the first embodiment.

Similarly to the above-described embodiment, all of split seal rings 100A, 100B and 100C have abutment surfaces. Each abutment surface includes first inclined surface 100a extending in a direction intersecting with a circumferential direction, first horizontal surface 100b extending from one end side (lower side in the figure) of first inclined surface 100a along the circumferential direction, and second inclined surface 100c extending from an end of first horizontal surface 100b opposite to first inclined surface 100a in the direction intersecting with the circumferential direction. Therefore, each abutment surface is formed of two inclined surfaces and one horizontal surface. The specifications required for the inclined surfaces and the horizontal surface are similar to those of the first embodiment.

The abutment surfaces provided in split seal rings 100A, 100B and 100C are preferably arranged so as to be circumferentially displaced in an upward and downward direction. A reason for this is that even if a lubricating oil leaks, a leakage path of the lubricating oil can be lengthened because the abutment surfaces are arranged so as to be circumferentially displaced from one another.

With this configuration as well, the function and effect similar to those of the split seal ring according to the first embodiment can be obtained.

Third Embodiment: Split Seal Rings 100D and 100E

Figure 7:
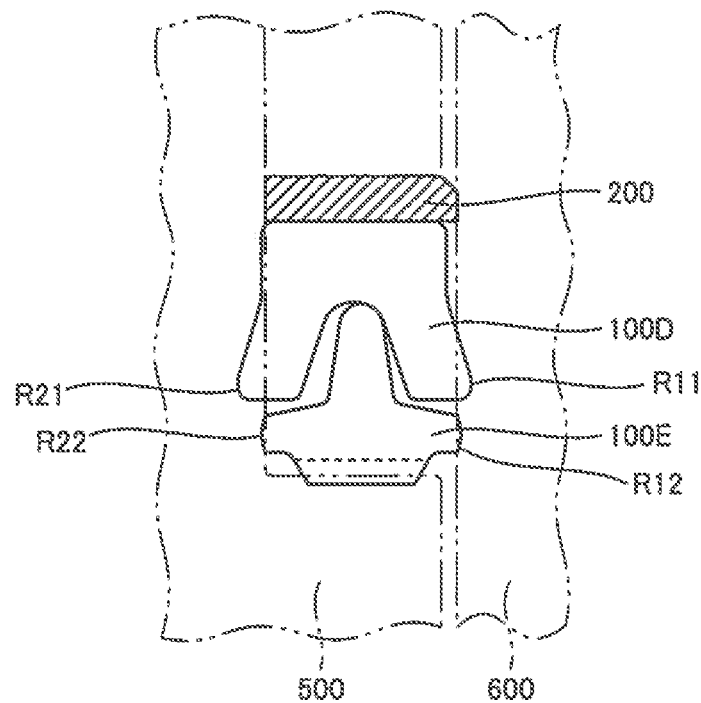
FIG. 7 is a cross-sectional view of split seal rings according to a third embodiment.
Figure 8:
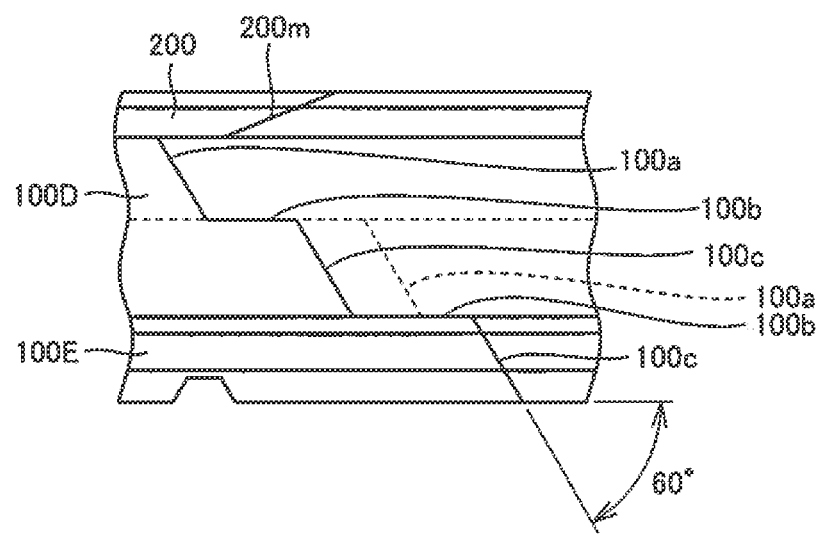
FIG. 8 shows abutment surfaces of the split seal rings according to the third embodiment when viewed from the outer circumferential surface side.

Split seal rings 100D and 100E according to a third embodiment will be described with reference to FIGS. 7 and 8. FIG. 7 is a cross-sectional view of split seal rings 100D and 100E. FIG. 8 shows abutment surfaces of split seal rings 100D and 100E when viewed from the outer circumferential surface side.

The present embodiment shows the case in which two split seal rings 100D and 100E having different cross-sectional shapes are stacked. Split seal ring 100D has a concave cross-sectional shape having a recessed portion on the lower side. Split seal ring 100E has a convex cross-sectional shape having a protruding portion on the upper side. The structure of back-up ring 200 is similar to that of the above-described first embodiment.

Split seal ring 100D functions as a bottom packing, and split seal ring 100E functions as a support adapter. Similarly to the first embodiment, hydrogenated nitrile rubber (HNBR), nitrile rubber (NBR), fluororubber (FKM) or the like is, for example, used for split seal rings 100D and 100E.

Since split seal rings 100D and 100E have outwardly-protruding regions R11 to R12 and R21 to R22, the number of lips is two.

Similarly to the above-described embodiments, both of split seal rings 100D and 100E have abutment surfaces. Each abutment surface includes first inclined surface 100a extending in a direction intersecting with a circumferential direction, first horizontal surface 100b extending from one end side (lower side in the figure) of first inclined surface 100a along the circumferential direction, and second inclined surface 100c extending from an end of first horizontal surface 100b opposite to first inclined surface 100a in the direction intersecting with the circumferential direction. Therefore, each abutment surface is formed of two inclined surfaces and one horizontal surface. The specifications required for the inclined surfaces and the horizontal surface are similar to those of the first embodiment.

The abutment surfaces provided in split seal rings 100D and 100E are preferably arranged so as to be circumferentially displaced in an upward and downward direction. A reason for this is that even if a lubricating oil leaks, a leakage path of the lubricating oil can be lengthened because the abutment surfaces are arranged so as to be circumferentially displaced from each other.

With this configuration as well, the function and effect similar to those of the split seal ring according to each of the above-described embodiments can be obtained.

Fourth Embodiment: Split Seal Rings 100F and 100G

Figure 9:
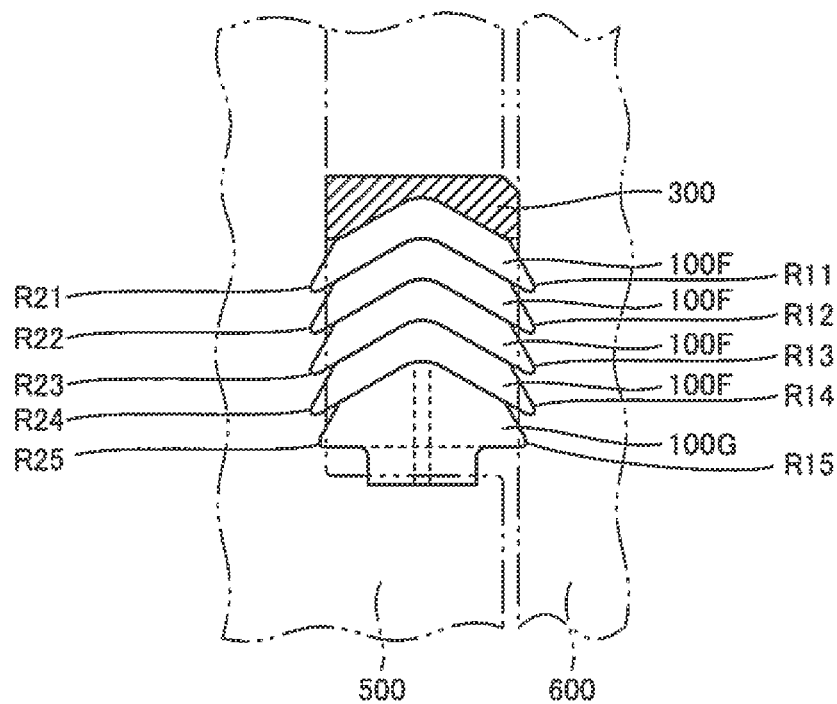
FIG. 9 is a cross-sectional view of split seal rings according to a fourth embodiment.
Figure 10:
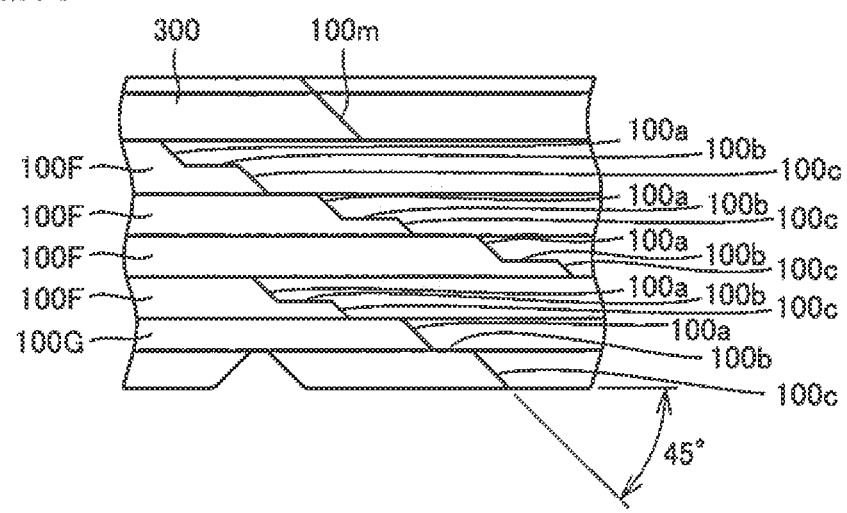
FIG. 10 shows abutment surfaces of the split seal rings according to the fourth embodiment when viewed from the outer circumferential surface side.

Split seal rings 100F and 100G according to a fourth embodiment will be described with reference to FIGS. 9 and 10. FIG. 9 is a cross-sectional view of split seal rings 100F and 100G. FIG. 10 shows abutment surfaces of split seal rings 100F and 100G when viewed from the outer circumferential surface side.

The present embodiment shows the case in which two split seal rings 100F and 100G having different cross-sectional shapes are stacked. Split seal ring 100F has a substantially V-shaped cross-sectional shape and four split seal rings 100F are stacked. The number of stacked split seal rings 100F can be changed as appropriate. Split seal ring 100E has an arrow-shaped cross-sectional shape having a protruding portion on the upper side.

A top adapter 300 is provided on uppermost split seal ring 100F, and an upper surface of top adapter 300 has a flat shape and a lower surface of top adapter 300 has a shape corresponding to the structure of split seal ring 100F. Filled polytetrafluoroethylene (PTFE) or the like is used as a material.

Split seal ring 100F functions as a V packing, and split seal ring 100G functions as a bottom adapter. Similarly to the first embodiment, hydrogenated nitrile rubber (HNBR), nitrile rubber (NBR), fluororubber (FKM) or the like is, for example, used for split seal rings 100F and 100G.

Since split seal rings 100F and 100G have outwardly-protruding regions R11 to R15 and R21 to R25, the number of lips is five.

Similarly to the above-described embodiments, both of split seal rings 100F and 100G have abutment surfaces. Each abutment surface includes first inclined surface 100a extending in a direction intersecting with a circumferential direction, first horizontal surface 100b extending from one end side (lower side in the figure) of first inclined surface 100a along the circumferential direction, and second inclined surface 100c extending from an end of first horizontal surface 100b opposite to first inclined surface 100a in the direction intersecting with the circumferential direction. Therefore, each abutment surface is formed of two inclined surfaces and one horizontal surface. Although the specifications required for the inclined surfaces and the horizontal surface are similar to those of the first embodiment, each inclined surface is inclined at an intersection angle of about 45 degrees with respect to the horizontal surface in the present embodiment.

The abutment surfaces provided in split seal rings 100F and 100G are preferably arranged so as to be circumferentially displaced in an upward and downward direction. A reason for this is that even if a lubricating oil leaks, a leakage path of the lubricating oil can be lengthened because the abutment surfaces are arranged so as to be circumferentially displaced from one another.

With this configuration as well, the function and effect similar to those of the split seal ring according to each of the above-described embodiments can be obtained.

Fifth Embodiment: Split Seal Rings 100H and 100I

Figure 11:
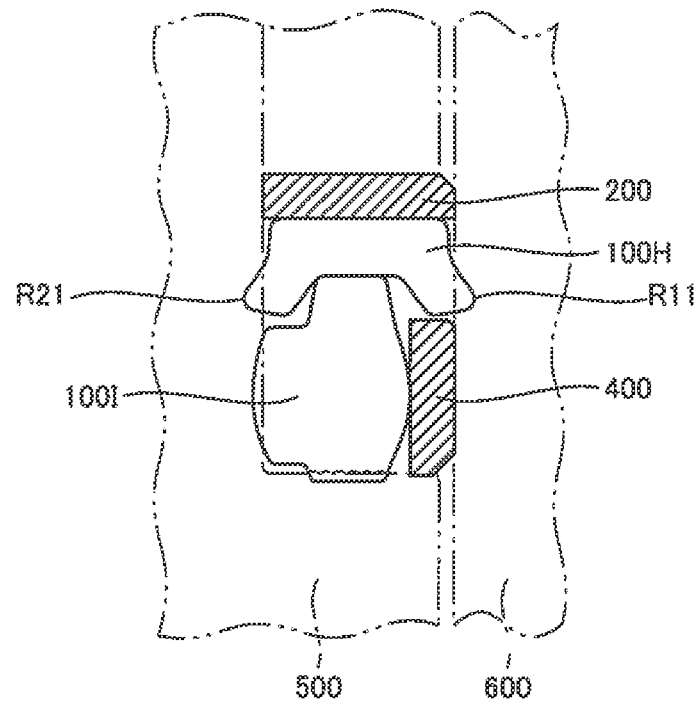
FIG. 11 is a cross-sectional view of split seal rings according to a fifth embodiment.
Figure 12:
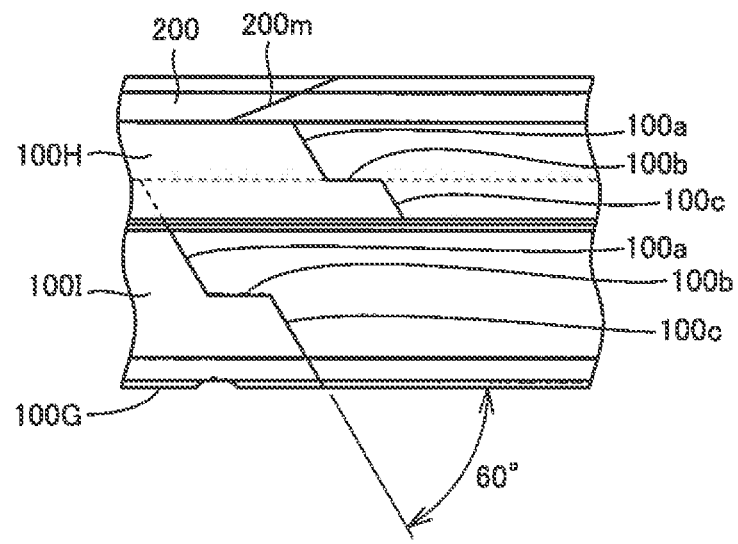
FIG. 12 shows abutment surfaces of the split seal rings according to the fifth embodiment when viewed from the outer circumferential surface side.

Split seal rings 100H and 100I according to a fifth embodiment will be described with reference to FIGS. 11 and 12. FIG. 11 is a cross-sectional view of split seal rings 100H and 100I. FIG. 12 shows abutment surfaces of split seal rings 100H and 100I when viewed from the outer circumferential surface side.

The present embodiment shows the case in which two split seal rings 100H and 100I having different cross-sectional shapes are stacked. Split seal ring 100H has a concave cross-sectional shape having a recessed portion on the lower side. Split seal ring 100I has a cross-sectional shape having protruding portions on the upper side and on the outer circumferential side. The structure of back-up ring 200 is similar to that of the above-described first embodiment. Furthermore, in the present embodiment, a sliding ring 400 is fitted into the inner circumferential side of split seal ring 100I. Although a material of sliding ring 400 may be similar to that of back-up ring 200, another material having lower sliding resistance may be used.

Split seal ring 100H functions as a bottom packing, and split seal ring 100I functions as a back ring. Similarly to the first embodiment, hydrogenated nitrile rubber (HNBR), nitrile rubber (NBR), fluororubber (FKM) or the like is, for example, used for split seal rings 100H and 100I.

Since split seal ring 100H has outwardly-protruding regions R11 and R21, the number of lips is one.

Similarly to the above-described embodiments, both of split seal rings 100H and 100I have abutment surfaces. Each abutment surface includes first inclined surface 100a extending in a direction intersecting with a circumferential direction, first horizontal surface 100b extending from one end side (lower side in the figure) of first inclined surface 100a along the circumferential direction, and second inclined surface 100c extending from an end of first horizontal surface 100b opposite to first inclined surface 100a in the direction intersecting with the circumferential direction. Therefore, each abutment surface is formed of two inclined surfaces and one horizontal surface. Although the specifications required for the inclined surfaces and the horizontal surface are similar to those of the first embodiment, each inclined surface is inclined at an intersection angle of about 45 degrees with respect to the horizontal surface in the present embodiment.

The abutment surfaces provided in split seal rings 100H and 100I are preferably arranged so as to be circumferentially displaced in an upward and downward direction. A reason for this is that even if a lubricating oil leaks, a leakage path of the lubricating oil can be lengthened because the abutment surfaces are arranged so as to be circumferentially displaced from each other.

With this configuration as well, the function and effect similar to those of the split seal ring according to each of the above-described embodiments can be obtained.

While the embodiments of the present invention have been described above, it should be understood that the embodiments disclosed herein are illustrative and non-restrictive in every respect. The scope of the present invention is defined by the terms of the claims, and is intended to include any modifications within the meaning and scope equivalent to the terms of the claims.

REFERENCE SIGNS LIST 100, 100A, 100B, 100C, 100D, 100E, 100F, 100G, 100H, 100I split seal ring; 100a first inclined surface; 100b first horizontal surface; 100c second inclined surface; 100d second horizontal surface; 100e third inclined surface; 100f vertical surface; 110 main body seal; 120, 200m abutment surface; 200 back-up ring; 300 top adapter; 400 sliding ring; 500 cylinder; 500g seal groove; 600 piston; R11, R12, R13, R14, R15 inner protruding portion; R21, R22, R23, R24, R25 outer protruding portion.

The invention claimed is:
1. A split seal ring comprising:
an annular main body seal split partially in a circumferential direction; and
abutment surfaces provided on split surfaces of the annular main body seal so as to be joined to each other,
each of the abutment surfaces including:
a first inclined surface extending in a direction intersecting with the circumferential direction;
a first horizontal surface extending from one end side of the first inclined surface along the circumferential direction; and
a second inclined surface extending from an end of the first horizontal surface opposite to the first inclined surface in the direction intersecting with the circumferential direction,
said annular main body seal having a radial inner circumferential-side side surface with inner protruding portions protruding radially inward from said radial inner circumferential-side side surface, where number of the inner protruding portions are identical to number of the inclined surfaces, and
said annular main body seal having a the radial outer circumferential-side side surface with outer protruding portions protruding radially outward from said radial outer circumferential-side side surface, number of the outer protruding portions being identical to number of the inclined surfaces.
2. The split seal ring according to claim 1, wherein each of the abutment surfaces includes:

a second horizontal surface extending from one end side of the second inclined surface opposite to the first horizontal surface along the circumferential direction; and a third inclined surface extending from an end of the second horizontal surface opposite to the second inclined surface in the direction intersecting with the circumferential direction.

3. The split seal ring of claim 1, wherein said inner protruding portions are symmetrically oriented with respect to said outer protruding portions.

4. The split ring of claim 1, further comprising a first axial face and a second axial face, said first axial face and said second axial face extending between said radial inner circumference-side surface and said radial outer circumference-side surface and configured for receiving an axial compression force.

* * * * *